June 30, 1942. A. G. FRIZELL 2,288,445
STOCK MARKER
Filed Nov. 7, 1940
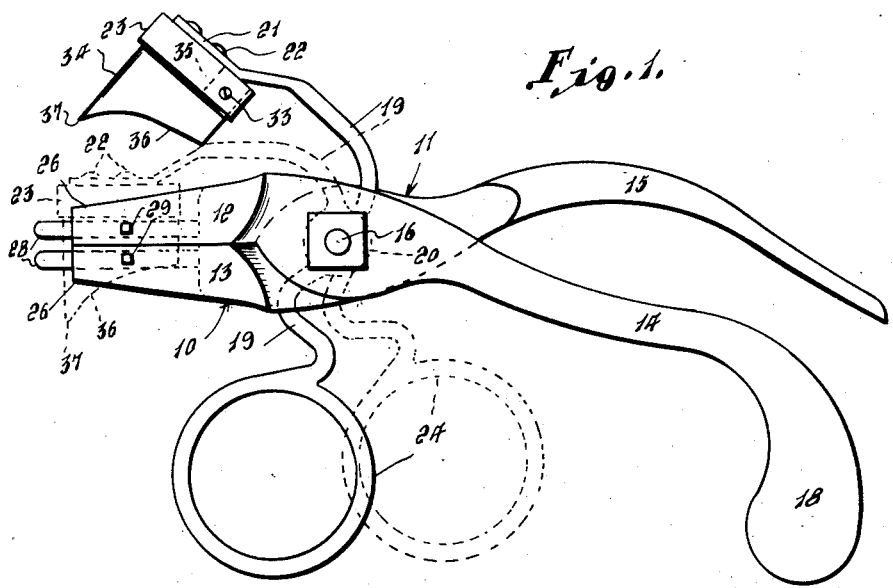
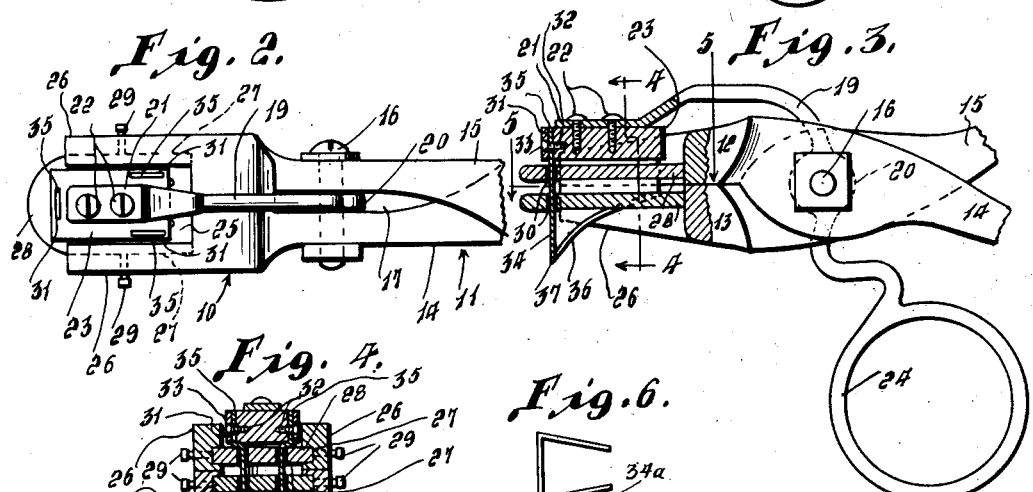
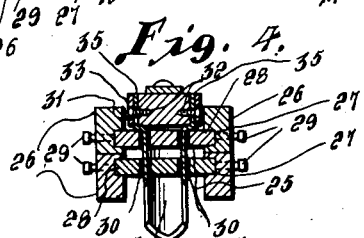
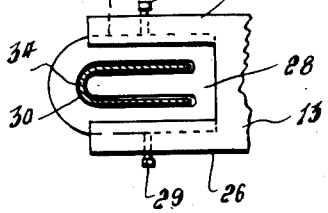
Inventor
A. G. Frizell
By L. F. Rudolph
Attorney Patented June 30, 1942

2,288,445

UNITED STATES PATENT OFFICE 2,288,445

STOCK MARKER

Absalom Guy Frizell, Greenfield, Iowa

Application November 7, 1940, Serial No. 364,745

1 Claim. (Cl. 128—316)

This invention relates to an improved device for marking livestock, and more particularly to a device for marking the ear of an animal by making an incision therein.

More particularly, it is an aim of the invention to provide an ear marker including a clamping member for clamping the portion of the ear to be cut, and a blade member movably mounted relatively to the clamping member for cutting the clamped portion of the ear.

Still a further aim of the invention is to provide an ear marker including a pincers type tool, the jaws of which form clamping members for engaging an ear, said jaws being adapted to detachably mount inserts having guide openings for receiving a blade, which is movable therethrough relatively to the pincers, for cutting through the ear.

Still another aim of the invention is to provide a lever, pivotally mounted intermediate of its ends, on the pivot of the pincers, and having a head at one end for detachably mounting a blade, for forming the incision, in the tool, to thereby provide a livestock marking device wherein blades of different shapes may be employed with the tool for making distinctive incisions.

Other objects and advantages of the invention will hereinafter become more fully apparent from the following description of the drawing, which illustrates a preferred embodiment thereof, and wherein:

Figure 1 is a side elevational view of the stock marker,

Figure 2 is a fragmentary top plan view of the same,

Figure 3 is a fragmentary side elevational view, partly in vertical section,

Figure 4 is a transverse vertical sectional view taken substantially along the plane of the line 4—4 of Figure 3, Figure 5 is a horizontal sectional view taken substantially along the plane of the line 5—5 of Figure 3, Figure 6 is a plan view showing a modified shape of cutting blade that is adapted to be mounted interchangeably on the tool, Figure 7 is a similar view of another shape of cutting blade, Figure 8 is a similar view of another shape of cutting blade, Figure 9 is a similar view of another shape of cutting blade, and Figure 10 is a similar view of still another shape of cutting blade.

Referring more particularly to the drawing, wherein like reference characters designate like or corresponding parts throughout the different views, 10 designates generally the stock marker including a pair of pincers, designated generally 11, which comprise the jaws 12 and 13, which are provided with integral handle portions 14 and 15, respectively. The handle portions 14 and 15 cross adjacent the jaws 12 and 13, and are pivotally connected, where they cross, by means of a bolt and nut fastening 16. As best seen in Figure 2, the crossed portions of the handles 14 and 15 are reduced on their inner, adjacent sides to form a space 17 therebetween, for a purpose which will hereinafter be described. As seen in Figure 1, the lower handle 14, which is formed integral with the upper jaw 12, has its free end enlarged and curved downwardly to form the portion 18, which corresponds generally in shape to a pistol stock. The free end of the handle portion 15 likewise extends downwardly toward the handle portion 14 so as to be disposed relatively close thereto, when the jaws 12 and 13 are closed, as seen in Figure 1.

The space 17 is provided to receive a lever 19, which extends therethrough, and which is provided with an eyelet 20 formed therein, intermediate of its ends, for loosely engaging the exposed intermediate portion of the bolt of the fastening 16 for pivotally mounting the lever 19 relatively to the pincers 11. One end of the lever 19 extends upwardly from the pincers 11 and is bent to project forwardly thereof toward the free ends of the jaws 12 and 13, and is provided at its free end with a flattened portion 21 to receive fastenings 22 for detachably mounting a head 23 on the underside of the portion 21. The opposite end of the lever 19 projects from the underside of the space 17 and is disposed beneath the pincers 11 and terminates in a finger loop 24, for a purpose which will hereinafter become apparent.

Jaws 12 and 13 are provided with bifurcated free ends forming a recess in each of the jaws 12 and 13, as seen at 25, which aline when the jaws 12 and 13 are closed. The furcations 26 of said bifurcated portions are provided with longitudinally disposed grooves 27 which open inwardly of the recess 25 and outwardly of the free ends of the furcations 26. The grooves of the furcations of the jaw 12 and of the jaw 13 are disposed in opposed relationship to one another to receive plates or inserts 28, one of which is mounted in the furcations 26 of each of the jaws. The inserts 28 are detachably clamped in position in the grooves 27 by means of set screws 29 which extend transversely through the furcations 26 and which extend into the grooves 27. In the embodiment of the invention as disclosed in Figures 1 to 5, the inserts 28 are provided with U-shaped slot like openings 30, as best seen in Figure 5.

The head 23 is provided with a plurality of spaced slots 31 which extend therethrough in the direction of the thickness thereof and with threaded recesses 32 which extend through and are disposed substantially at right angles to the planes of the slots 31, for receiving set screws 33. A blade 34 which is shaped and sized to fit the slots 30, is provided at its upper, back edge with a plurality of outwardly offset upwardly projecting ears 35, which are adapted to be received in the slots 31 and which are apertured to form the openings to aline with the recesses 32 so that the set screws 33 can be applied therethrough for detachably mounting the blade 34 beneath the head 23. The lower edge 36 of the blade 34 is sharpened to form a U-shaped cutting edge which converges downwardly from the end thereof to form a downwardly tapered pointed intermediate portion 37.

Assuming that the parts are assembled, as illustrated in Figures 1 to 5, the handle portions 14 and 15 may be grasped for moving the jaws 12 and 13 to closed positions for clamping an ear of an animal, not shown, between the jaws 12 and 13. It will be obvious that the jaws and handle portions may be moved relatively to the lever 19 which, while the jaws 12 and 13 are being applied to the animal's ear will be in its full line position, as seen in Figure 1, so that the blade 34 will be in a raised, retracted position away from the inserts 28. With the jaws 12 and 13 held in clamping engagement with the animal's ear by applying pressure to the handle portions 14 and 15, the index finger of the operator, of the hand holding the handle portions 14 and 15, may be positioned in the finger loop 24 for swinging the finger loop 24 rearwardly from its full line to its dotted line position, of Figure 1, to swing the upper end 21 of the lever 19 forwardly and downwardly. This will cause the blade 34, carried thereby, to be swung downwardly and through the slots 30, which are alined, when the jaws 12 and 13 are closed, and into its projected, dotted line position of Figure 1, for making an incision in the animal's ear corresponding to the shape of the blade 34. The blade 34 is supported by the lever 19 in a proper position so that it will pass through the slot like openings 30 when the lever 19 is projected to its dotted line position. The lever 19 can then be retracted and returned to its full line position, of Figure 1, after which the handles 14 and 15 are released and moved away from one another to release the jaws 12 and 13 from the ear of the animal. It will thus be seen that the stock marker 10 forms a tool whereby the animal's ear may be clamped around the portion thereof in which the invision is to be made and effectively held while the incision is being made to avoid any danger of the animal pulling away so that the ear will be torn by the blade.

The blade 34 is only intended to illustrate one design of blade and it is to be understood that blades of various designs may be employed interchangeably on the head 23, by equipping blades of all designs with the ears 35 which are correctly disposed to be received in the slots 31. In a like manner, the inserts or plates 28 may be provided with openings 30 of various shapes to conform to the shape of the blade to be received therein. It will thus be seen that the marker 10 may be employed for forming various distinctive incisions. In Figures 6 to 10, inclusive, the cutting edges of five different types or designs of blades are illustrated, designated 34a, 34b, 34c, 34d and 34e respectively, which are intended to be illustrative of a few of the possible designs which might be employed, and in each case, it is to be understood that the inserts 28 would be provided with openings 30 corresponding to the shapes of these cutting edges. Likewise, in each form of blade it is intended to have the cutting edge provided with a tapered pointed portion so that the cut will be a slicing cut rather than a chopping cut and therefore less painful to the animal, and the blade 34e should be provided with two, diametrically opposed tapered pointed portions. Where a blade, such as the blade 34e is provided the inserts 28 would of course be provided with a circular opening.

Various modifications and changes in the construction and arrangement of the parts forming the invention are contemplated and may obviously be resorted to as only a preferred embodiment of the invention has been disclosed.

I claim as my invention:

A stock marker comprising a pair of clamping members for engaging the ear of an animal, said clamping members each being bifurcated, the furcations of each of said clamping members being provided with opposed inwardly opening slots, inserts detachably mounted in said slots, said inserts being provided with corresponding openings, disposed in alinement when the clamping members are in a closed position, and a blade swingably mounted relatively to the clamping members, said blade being shaped and sized to correspond to the shape and size of said openings, said blade having an elongated lower cutting edge extending from end to end thereof and disposed for movement through the openings.

A. GUY FRIZELL.